Jan. 18, 1949.   S. STEINITZ   2,459,551
VOLTAGE AND PHASE CONTROL
Filed April 12, 1946

INVENTOR.
STEPHAN STEINITZ
BY
Lawrence K. Sager
his ATTORNEY

Patented Jan. 18, 1949

2,459,551

UNITED STATES PATENT OFFICE 2,459,551

VOLTAGE AND PHASE CONTROL

Stephan Steinitz, New York, N. Y., assignor to Ward Leonard Electric Company, a corporation of New York Application April 12, 1946, Serial No. 661,546

3 Claims. (Cl. 323—89)

1

This invention relates to electric controlling apparatus particularly applicable to changing the voltage applied to a consumption circuit over a wide range, such as in dimmer control of a lamp circuit for theaters and the like. It also relates to improved means for shifting the phase of the electromotive force of a control circuit and method of phase shifting, for example in the control of the electromotive force applied to the grid circuit of a gas filled or thyratron tube.

The main object of the invention is to accomplish the results with apparatus of a simple and readily available character and which is dependable under long continued use. Another important object is to accomplish control of the consumption circuit voltage over a wide range. A further important object is to accomplish this by the use of devices of small size compared with those previously required. These and other objects and advantages will be understood from the following description and accompanying drawings illustrating a preferred embodiment.

Figure 1:
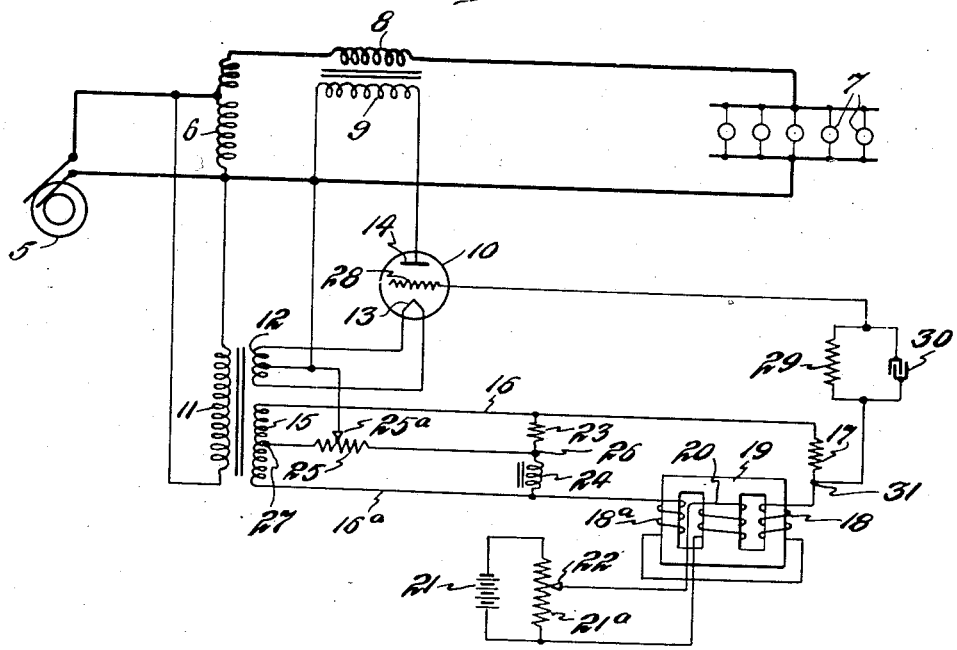
Figure 2:
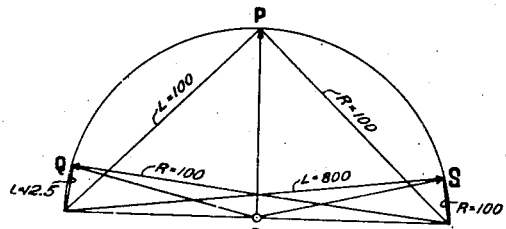
Figure 3:
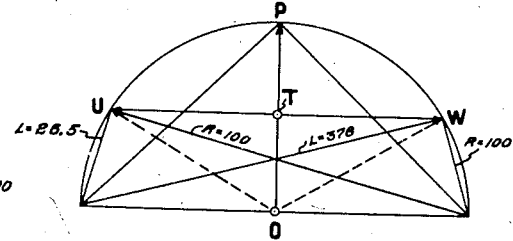

Fig. 1 is a diagram; and Figs. 2 and 3 are explanatory charts.

Referring to Fig. 1, an alternating current source 5 supplies current to an auto-transformer 6 which supplies current to a circuit to which are connected the translating devices indicated as lamps 7 in this instance. In series with one of the supply lines is the primary winding 8 of a series transformer of the reactor type having a secondary winding 9. The auto-transformer 6 serves to boost the voltage of the supply lines to compensate for the drop in voltage in the series transformer primary 8 in order to apply the full voltage of the source to the consumption circuit when the controlling apparatus is adjusted for obtaining maximum brilliancy of the lamps.

A thyratron or three-element gas filled tube or rectifier 10 allows direct current to flow in the secondary winding 9 of the series transformer; and as this saturating current is varied, the reactance of the primary winding 8 is varied and thereby controls the voltage applied to the consumption circuit over a wide range. A transformer having a primary 11 connected to the source 5 is provided with a secondary winding 12. Its terminals supply heating current to the cathode 13 of the tube 10. The plate or anode 14 of the tube is connected to one terminal of the controlling winding 9, the other terminal of which is connected to the mid-point of the secondary 12. Thus the plate circuit of the tube is from the mid-point of the secondary 12, through the winding 9 to the plate 14, cathode

2

13 and then to the terminals of the winding 12.

The grid circuit is controlled in a manner such that the phase of its electromotive is shifted over a wide range and may readily be shifted over the full range of 180° for controlling the output of the tube from zero to its full output. The present invention accomplishes this by the use of controlling means requiring comparatively small range of control and by the use of variable means of comparatively small size.

The transformer having the primary 11 is provided with another secondary winding 15. This supplies current to the leads 16 and 16a. A non-inducitve impedance device or resistor 17 is connected at one terminal to the lead 16 and is in series with the windings 18 and 18a on the outside legs of a saturable reactor having a three-legged core 19 to the other lead 16a. The middle leg of the core is provided with a winding 20 supplied with a variable saturating current from any direct current source, shown for simplicity as a battery 21. A potentiometer 21a is shown connected across the terminals of the battery, the movable contact 22 being connected to one terminal of the winding 20, the other winding terminal being connected to one side of the battery.

Another non-inductive impedance device or resistor 23 is connected to the lead 16 and is in series with an inductor or inductive impedance device 24 connected to the lead 16a. An impedance device or resistor 25 is connected from the point 26 in the connection between the devices 23 and 24, to the mid-point 27 of the secondary winding 15. The resistor 25 is shown having a movable contact 25a in engagement therewith. This contact is connected to the mid-point of the transformer secondary 12. The grid 28 of the tube 10 is connected through filtering devices 29 and 30 to the point 31 in the connection from the resistor 17 to the inductive windings 18 and 18a. The grid circuit may be traced from the cathode 13 to the grid 28, then through the filtering devices to the connection 31, then in one path through the windings 18, 18a and 24 to the connection 26 and in another path through the resistors 17 and 23 to the connection 26, and from the connection 26 through a portion of the resistor 25 to the contact 25a, then to the secondary winding 12 and cathode 13 back to the grid 28. When the reactance of the windings 18 and 18a is varied over a comparatively small range by adjustment of the contact 22, the phase of the electromotive force applied to the grid circuit may be shifted a full 180° to control the output of the tube from zero to its maximum. This, as already explained, varies the voltage applied to the consumption circuit or lamps 7 over a wide range.

The advantage of this improvement as regards the means for shifting the phase of the electromotive force applied to the grid circuit may be explained in a general way by first considering Fig. 2. This is a vector diagram showing the phase shift of an electromotive force without the present improvement and assumes that the controlled circuit subjected to the shifting in phase is connected from a point between a variable inductor and a fixed resistor connected in series across the voltage supply and to a mid-point on the voltage supply. In Fig. 2 the base line represents the phase of the supplied electromotive force. If the reactive impedance of the inductor were made equal to the impedance of the resistor, say 100 units each, then the phase of the electromotive force applied to the controlled circuit would be 90° out of phase with that of the source. This displaced phase is represented in Fig. 2 by the line OP with the impedance of the inductor designated as $L=100$ and that of the resistor as $R=100$. Now assume that the impedance of the inductor is adjusted and reduced to one-eighth of its former value or $L=12.5$ and $R=100$ as before. Then the phase of the electromotive force applied to the controlled circuit would be represented by the line OQ in Fig. 2. Now assume that the impedance of the inductor be increased to eight times the value first assumed to $L=800$ and $R=100$ as before. The phase of the electromotive force to which the controlled circuit is subjected is then indicated by the line OS. Thus although the range of change in the value of L was made as great as from 12.5 to 800, or a ratio of 1 to 64, yet the resulting phase shift from OQ to OS was only about 152°. A closer approach to 0° on one side and to 180° on the other, would result in a necessary proportional change in the value of L which would become highly impractical.

Fig. 3 may now be referred to which shows the conditions resulting from the relationship of the parts in Fig. 1, whereby a full 180° phase shift of electromotive force applied to the grid circuit is obtained by a comparatively small range of change required from the variable reactance. This, of course, permits the variable reactor and other parts to be made very much smaller than in the case assumed with reference to Fig. 2. In Fig. 1 a resistor 25 is connected between the point 26 in the connection between the resistor 23 and the inductor 24 and the point 27 of the source. The impedance of the resistor 23 and that of the inductor 24 may be assumed to have such values as to cause the phase of the electromotive force of the circuit from 26 to 27 through 25 to be 90° out of phase with the electromotive force of the source. This condition is represented by the line OP in Fig. 3 corresponding to the line OP in Fig. 2. However, in Fig. 1 the controlled circuit, represented by the grid circuit, is connected from the point 31 to an intermediate point in the resistor 25. Therefore it follows that the base point of control is thus shifted from O in Fig. 3 to a new base point T on the circuit through 25 which is 90° out of phase with that of the supply. Now let it be assumed that the reactive impedance of the inductive windings 18, 18a be made say 26.5 units and that of the impedance of the resistor 17 be of a fixed relative value of 100 units, as indicated on Fig. 3. Then the phase of the electromotive force applied to the controlled circuit, in this case the grid circuit, is represented by the line TU which is in phase with the supplied electromotive force represented by the horizontal base line. Now assume that the value of L be increased to say 378 units with reference to R which remains at a relative value of 100 units. Then, as indicated in Fig. 3, the phase of the electromotive force applied to the controlled circuit has shifted from TU to TW, a full 180° phase shift. And yet in obtaining this full phase shift, the value of L has required a change only from about 26.5 to 378, a ratio of change of only about 1 to 14.3. This compares with a ratio of 1 to 64 required in the case of Fig. 2 and then the resulting phase shift attained was only about 152°. It is thus apparent that this improvement obtains the advantage of greatly reducing the size and required range of change of the controlling parts and likewise avoids the above mentioned difficulties at the limits of control in obtaining a phase shift of 180°. In Fig. 3 the dotted lines OU and OW have been drawn which shows the limited phase shift which would have been obtained when $L=26.5$ and 378 respectively without the utilization of the present improvement.

It will be understood that in the foregoing explanations, the particular relative values of the inductors and resistors and the range of control, as well as the location of the connection 25a to the resistor 24 have been made for simplicity of explanation and that any other appropriate relative values and point of connection of 25a may be made for adaptation to particular requirements and that variations likewise may be made in the character of the various devices for obtaining desired results. In the foregoing general explanations, it has been assumed that the controlling devices for obtaining the shifting in phase have been purely inductive and resistive but it is obvious that in practice these devices may be mainly inductive and non-inductive or capacitive and that the phase relationships particularly described may be departed from and still obtain satisfactory results. Also various modifications and relationship of the parts may be made without departing from the scope of the invention.

I claim:

1. Electric controlling apparatus comprising a gas filled three-element tube, an alternating current source for supplying energy to said tube, an output circuit connected in the plate circuit of said tube, impedance devices of different character from each other connected in series across said source for establishing an electromotive force out of phase with the electromotive force of said source between an intermediate point of said devices and said source, an impedance device connected between said intermediate point and said source, one side of the grid circuit of said tube being connected to an intermediate point of said last named device, additional impedance devices of different character from each other connected in series across said source for establishing an electromotive force out of phase with said source between an intermediate point of said additional devices and said source, the other side of said grid circuit being connected to a point between said additional devices, and one of said additional devices being variable for shifting the phase of the electromotive force applied to the grid circuit for varying the output of the tube.

2. Electric controlling apparatus for shifting the phase of the electromotive force applied to a controlled circuit comprising an alternating current source, impedance devices of different character from each other connected in series across said source for establishing an electromotive force out of phase with the electromotive force of said source between an intermediate point of said devices and said source, an impedance device connected between said intermediate point and said source, one side of said controlled circuit being connected to an intermediate point of said last named device, additional impedance devices of different character from each other connected in series across said source for establishing an electromotive force out of phase with said source between an intermediate point of said additional devices and said source, the other side of said controlled circuit being connected to a point between said additional devices, and one of said additional devices being variable for shifting the phase of the electromotive force applied to said controlled circuit.

3. Electric controlling apparatus for shifting the phase of an electromotive force applied to a controlled circuit comprising a source of alternating current, a resistive device and an inductive device connected in series across said source, an impedance device connected from a point between said devices to said source, one side of said controlled circuit being connected to an intermediate point of said impedance device, an additional resistive device and an additional inductive device connected in series across said source, the other side of said controlled circuit being connected to a point between said additional devices, and means for varying the reactance of said additional inductive device.

STEPHAN STEINITZ.

REFERENCES CITED

The following references are of record in the file of this patent:

UNITED STATES PATENTS

| Number | Name | Date |
| --- | --- | --- |
| 2,030,100 | Dawson | Feb. 11, 1936 |
| 2,222,871 | Locke | Nov. 26, 1940 |